US008238869B2

(12) United States Patent
Brayton

(10) Patent No.: US 8,238,869 B2
(45) Date of Patent: Aug. 7, 2012

(54) LIFESAVER PERSONAL ALERT AND NOTIFICATION DEVICE

(76) Inventor: D. Dwight Brayton, Richland, WA (US)

( * ) Notice: Subject to any disclaimer, the term of this patent is extended or adjusted under 35 U.S.C. 154(b) by 288 days.

(21) Appl. No.: 11/993,187

(22) PCT Filed: Jun. 20, 2006

(86) PCT No.: PCT/US2006/023972
§ 371 (c)(1), (2), (4) Date: Jul. 19, 2010

(87) PCT Pub. No.: WO2007/002082
PCT Pub. Date: Jan. 4, 2007

(65) Prior Publication Data

US 2010/0311384 A1 Dec. 9, 2010

Related U.S. Application Data

(60) Provisional application No. 60/693,541, filed on Jun. 23, 2005.

(51) Int. Cl.
*H04M 11/04* (2006.01)

(52) U.S. Cl. ..................... 455/404.1; 455/404.2; 379/45

(58) Field of Classification Search .................. 455/404, 455/466, 567; 340/287–309, 539; 379/37–51
See application file for complete search history.

(56) References Cited

U.S. PATENT DOCUMENTS

| | | | | |
|---|---|---|---|---|
| 6,792,081 | B1 * | 9/2004 | Contractor | 379/45 |
| 2002/0076003 | A1 | 6/2002 | Zellner et al. | |
| 2003/0003900 | A1 | 1/2003 | Goss et al. | |
| 2003/0069002 | A1 * | 4/2003 | Hunter et al. | 455/404 |

FOREIGN PATENT DOCUMENTS

| | | |
|---|---|---|
| WO | 0038124 | 6/2000 |

* cited by examiner

*Primary Examiner* — Kamran Afshar
*Assistant Examiner* — Kashif Siddiqui
(74) *Attorney, Agent, or Firm* — Fish & Associates, PC

(57) ABSTRACT

Systems and methods of alert and notification transmission are contemplated in which a low-range transceiver provides an alert/notification to a plurality of users having a wearable transceiver. Most typically, the low-range transceiver (a) is located in a wide area notification zone and a trigger device provides a signal from a wide area notification device to the low-range transceiver and (b) is used to also provide non-emergency notifications to the wearable transceivers. It should be appreciated that transmission of the emergency signal using the low-range transceiver is automatic, while transmission of the non-emergency notifications requires manual user input.

23 Claims, 1 Drawing Sheet

LIFESAVER PERSONAL ALERT AND NOTIFICATION DEVICE

This application claims priority to our U.S. provisional patent application with the serial number 60/693,541, which was filed Jun. 23, 2005.

FIELD OF THE INVENTION

The field of the invention is devices and methods for personal alert and notification.

BACKGROUND OF THE INVENTION

All or almost all of the currently known alert systems may be categorized into either wide area alert/notification systems or local area alert/notification systems, and depending on the particular system, individual parties or the general public are addressed with a specific message.

For example, systems to alert the general public of an impending natural disaster (e.g., hurricane, tsunami, tornado, etc.) or large-scale incidents (e.g., chemical/nuclear plant failure, terrorist attack, etc.) typically rely on an operator or other mechanism to trigger transmission of an emergency signal over a wide area notification zone. Commonly known instances for such wide area notifications include radio transmissions to Tone Alert Radios (TAR), cable and/or radio-controlled operation of sirens, public announcement systems, public bill boards, and/or automated dialers that call a geographically defined group of phone and/or pager subscribers.

While such wide area systems often reach a substantial portion of the general public, numerous disadvantages remain. Among other things, members of the public without access to a TAR or telephone are typically not aware of an alert/notification. Similarly, and especially in relatively noisy or isolated environments (e.g., within a plant, on a beach, or in an airport), alert/notifications via sirens and/or speakers of a public announcement system are often not accurately understood or even readily perceived. In still further examples, and especially where alert/notifications are provided via cell phones, lack of reliable coverage area often prevents effective notification of all intended recipients.

On the other hand, local area alert/notification systems typically provide area specific notification, which is generally of little to no interest to people outside the coverage area of such systems. Most commonly, local area alert/notification systems find use in restaurant paging to indicate availability of a table in a restaurant, or in hospitals that alert a doctor or nurse of a patient in need of attention. Moreover, most of the local paging systems only provide a blinking light, buzzing, and/or numeric display. Thus, such systems are typically not used for alert and notification of the public within the local area, where the notification relates to impending natural disasters and/or large-scale incidents. Still further, if local paging systems would be used for dissemination of emergency messages, such systems would have to reply on the operator receiving an emergency message in the first place and would then require the operator to stay on task to manually relay that message through the local paging system.

Therefore, while numerous devices and methods for alert notification are known in the art, all or almost all of them, suffer from one or more disadvantages. Therefore, there is still a need for improved systems and methods to provide alert and notification to members of the general public.

SUMMARY OF THE INVENTION

The present invention is directed to systems, devices, and methods of transmitting in a wide area notification zone a plurality of notifications to a plurality of users in an automated, independent, and localized manner. Most preferably, a trigger device is configured to detect and receive a signal from a wide area notification device, and is further configured to activate a low-range transceiver within the wide area notification zone. The low-range transceiver then sends a notification to the plurality of users via wearable transceivers, which may transmit one or more feedback messages to the low-range transceiver. It is further preferred that in a non-emergency use, the low-range transceiver may also be employed in a non-automated manner to transmit personal messages to one or more users.

Therefore, in one aspect of the inventive subject matter, a notification system includes a trigger device having an input module that is configured to receive a first signal from a wide area notification device, and further having an output module that is configured to provide a second signal to a low-range transceiver. Preferably, the low-range transceiver is configured to provide a third signal to at least two wearable transceivers in response to the second signal, to provide a fourth signal to at least one of the wearable transceivers in response to an operator input, and to optionally receive a fifth signal, wherein the wearable transceivers are configured to provide a notification to a person in response to at least one of the third and fourth signals, and wherein the wearable transceivers are configured to send the fifth signal.

Among other suitable devices, especially contemplated wide area notification devices include siren towers, tone alert radios, telephones, pagers, computers, TV sets, etc. It is also typically preferred that the trigger device is integral with the wide area notification device (e.g., as hardware on the siren tower, or as driver software in the computer). Depending on the particular trigger device, the output module may therefore provide a signal to the low-range transceiver via radio signal or electric cable. It is still further generally preferred that the low-range transceiver is configured to operate at a frequency and power output that does not require a broadcast license, and that the low-range transceiver transmits both, an emergency signal and a non-emergency signal that is specific to the location of the low-range transceiver. With respect to the wearable transceivers it should be appreciated that numerous manners of alerting and notification are deemed suitable, however, it is especially preferred that the wearable transceivers have text display and/or provide a verbal audible message.

Therefore, a method of providing a notification system will comprise the steps of instructing a user to operate a low-range transceiver within a wide area notification zone such that the low-range transceiver receives a signal from a trigger device, wherein the trigger device provides the signal to the low-range transceiver in response to a wide area notification signal of a wide area notification device located in the wide area notification zone, and to distribute a plurality of wearable transceivers to a plurality of users, wherein the low-range transceiver is configured to transmit a secondary notification signal without user intervention to a plurality of wearable transceivers and to transmit a tertiary signal with user intervention to at least one of the plurality of wearable transceivers.

Most preferably, the trigger device is electronically (and in some cases mechanically) coupled to the wide area notification device. In still further preferred aspects, the low-range transceiver is configured to operate at a frequency and power output that allows operation without a broadcast license and may further receive a feedback signal from at least one of the wearable transceivers, which may be configured as a ring, bracelet, or a pager. However, it should be noted that the wearable transceivers may provide a feedback signal to the low-range transceiver and/or other device. In an especially preferred method, the low-range transceiver will not only be used to automatically relay or transmit an emergency signal, but also be used to transmit a non-emergency signal (e.g., entertainment or personal message) to one or more users.

Viewed from a different perspective, and in a still further contemplated aspect of the inventive subject matter, a method of providing notification to a plurality of users may include a step of using a low-range transceiver to automatically, plurally, and locally relay within a wide area notification area a first notification signal from a wide area notification device. In another step, a second notification signal is manually provided to at least one of the plurality of users using the low-range transceiver. As discussed above, preferred wide area notification device include siren towers, tone alert radios, telephones, pagers, computers, and TV sets, wherein a trigger device may operationally couple the wide area notification device with the low-range transceiver. Especially preferred notification signals are in a text display format and/or a verbal audible format. First and second notification signals are typically received by a plurality of wearable transceivers worn by the plurality of users, respectively, and the wearable transceivers may further be configured to provide a feedback signal (e.g., to the low-range transceiver).

Various objects, features, aspects and advantages of the present invention will become more apparent from the following detailed description of preferred embodiments of the invention.

DETAILED DESCRIPTION

Figure 1A:
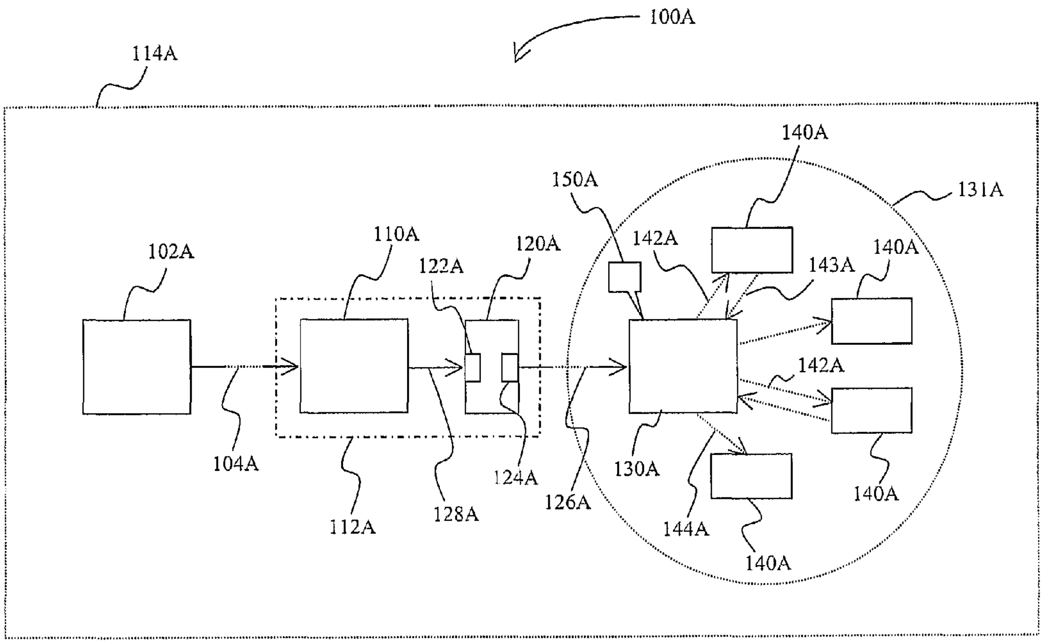
FIG. 1A is a schematic of an exemplary notification system in which the trigger device is physically associated with the wide area notification device.

The inventor has discovered that an alert system can be configured to allow a wide area notification device (e.g., TAR, siren, telephone, etc.) to activate a low-range transceiver within the wide area notification zone to automatically set off an alert to a plurality of wearable transceivers that will notify the wearer of an emergency. Most preferably, the low-range transceiver and the wearable transceivers are further configured to allow individual and/or group broadcasting of a non-emergency notification using operator input. The low-range transceiver is in most cases activated using a trigger device that is operationally and/or electronically coupled to the wide area notification device such that no user intervention is required.

As used herein, the "wide area notification device" refers to all notification devices that are activated by a command central or activation mechanism from a remote location over a distance of at least 5 kilometers, more typically at least 50 kilometers, and most typically more at least 500 kilometers, and that provide an audible alert signal (e.g., siren sound, public announcement), a visually perceptible signal (e.g., flashing light, displayed text message), or an electronic signal that activates an emergency response device (e.g., flood gate, shut-down device for air intake of air conditioning in a building or complex). For example, a coastal siren on a siren tower in the state of Oregon is considered wide area notification device as the activation signal may be provided from the Pacific Tsunami Warning Center in Honolulu, Hi. Similarly, a TAR located in a hotel resort in Miami Beach, Fla., is considered a wide area notification device as the activation may be received from the NOAA Weather Service in Silver Spring, Md. In yet another example, the wide area notification device may be TV set or a laptop computer in a wireless hotspot in the airport in Tulsa, Okla., where the computer is set up to receive and display a storm alert from the National Weather Service Storm Prediction Center in Norman, Okla.

Therefore, the term "wide area notification zone" as used herein refers to an area in which a wide area notification device receives a signal that triggers the wide area notification device to provide the emergency notification. Consequently, and depending on the particular notification device and activation mechanism, the notification zone may be relatively limited (e.g., several tens of $km^2$), more wide-spread (e.g., countywide or statewide) or considerably large (e.g., pacific coast of the U.S.). Furthermore, and again depending on the particular nature of the notification device, the term "emergency signal" as used herein may refer to any signal that will indicate to a user impending or actual occurrence of a potentially health or life threatening event. For example, contemplated emergency signals of wide area notification devices include siren sounds, recorded or live verbal messages from a TAR or TV set, displayed messages on a computer screen, TV screen, and/or highway billboard, etc., while contemplated emergency signals of wearable transceivers especially include visible signals (e.g., strobe or flashing/blinking lights, or text display of an emergency message), audible signals (e.g., continuous beeps or verbal audible messages), and/or all other signals that attract attention to a user in close contact with the device (e.g., vibration, or a hot/cold spot). Viewed from a different perspective, contemplated emergency signals include advisories, warnings, evacuation orders, area intrusion alarms, etc.

As also used herein, the term "low-range transceiver" refers to all transceivers that are configured to operate at a frequency and/or power output such that the service zone of the low range transceiver is smaller than the wide area notification zone. Therefore, most typically, preferred low-range transceivers will operate using the family radio spectrum of frequencies (462 and 467 MHz) having a maximum effective radiated power of 0.5 W. In such cases, the low-range transceiver will typically have a service area (low-range notification zone) of less than 20 km and more typically less than 10 km as measured as linear distance between the low-range transmitter and a receiver/transceiver that receives the signal from the low-range transceiver. However, in less preferred aspects of the inventive subject matter, the low-range transceiver may also operate at numerous alternative frequencies and bands, including microwave bands (e.g., 800 MHz band), VHF and UHF frequencies at a power output of 0.1-100 W, and even more. With respect to the term "transceiver" as used herein, it should be noted that this term generally refers to a device that is configured to receive and transmit radio signals. However, in less preferred aspects, devices that are configured to only receive radio signals are also included in the definition of the term "transceiver".

As still further used herein, the term "wearable transceiver" refers to all transceivers that are sufficiently small to allow the transceiver to be worn on the body, in a pocket of a garment, or in a handheld purse or small backpack (typically having a largest dimension of the packing compartment of less than 25 cm). Therefore, preferred wearable transceivers will have a largest dimension of less than 10 cm, and more typically of less than 7 cm, and most preferably of less than 5 cm.

The term "trigger device" as used herein refers to refers to any interface between the wide area notification device and the low-range transmitter that is configured to (a) perceive, receive, and/or relay a notification signal from the wide area notification device and (b) to activate the low-range transceiver upon perception, reception, and/or relay of the notification signal of the wide area notification device such that the low-range will transmit a notification signal to at least two wearable transceivers. For example, where the wide area notification device is a computer, the trigger device may comprise or be a virtual device (e.g., software code). In another example, where the wide area notification device is a siren, the trigger device may be a physical device (e.g., circuit board that relays activation signal of the siren).

In one exemplary aspect of the inventive subject matter, a hotel complex offers many recreational programs and child care facilities, is located in a potential tsunami impact area, and the nearest location for a siren and public announcement system is approximately half a mile from the hotel complex. Here, both wide area notification devices (siren and the public announcement system) include a trigger device that recognizes and/or relays the emergency signal broadcast by the wide area notification devices.

For example, the trigger device in the siren may comprise a circuitry that has an input module configured to copy control signals (e.g., DTMF signal or activation from logic control unit) of the siren activation controller and an output module that provides the copied signals to via radio transmission (e.g., via 800 MHz band) or electric cable to the low-range transceiver. In another example, the trigger device in the public announcement system may include an input module that copies the audio signal prior to amplification (in analog or digital form) and an output module that again provides the copied signals via radio transmission or electric cable to the low-range transceiver. Most preferably, power demand of the trigger device is satisfied from at least two sources, typically a solar powered battery or capacitor and the siren activation controller or public announcement controller.

The low-range transceiver is typically located in an office or utility room of the hotel complex and is configured to receive the signal(s) from the trigger device(s). Among other suitable configurations, signal transmission from the trigger device to the low-range transceiver is preferably via radio waves and/or hardwired connections. Regardless of the manner of connections, it should be appreciated that the low-range transceiver will then automatically (i.e., without input or other immediate activity of a person) translate the signal received from the trigger devices into suitable signals in a format appropriate for transmission to at least two, more typically at least 50%, even more typically at least 70%, and most typically all of the wearable transceivers. It should be noted that the signal translation will predominantly depend on the type of wide area notification device and type of wearable transceivers. For example, the siren signal could be translated into a text message on a wearable transceiver, or a vibration alert. In another example, a public announcement could be translated to a verbal audible message, a displayed transcript of the public announcement, or a strobe light. While such automatic message translation is preferably immediately transmitted to the wearable transceivers, it should further be appreciated that delaying such messages may also be desirable (e.g., to provide a second emergency notification that is offset in time from the first notification).

Most typically, the low-range transceiver will transmit the signal to all of the wearable transceivers using radio waves at suitable frequency and power output. In especially preferred aspects, the low-range transceiver is configured to operate at a frequency and power output that allows operation without a broadcast license (e.g., using family radio spectrum band of frequencies). However, alternative frequencies and power output are also contemplated. Thus, it should be appreciated that contemplated systems and methods provide an automatic, plural (i.e., to more than one wearable receiver), and locally restricted (typically by range of to low-range transceiver) emergency signal that can be broadcast directly to a user irrespective of his or her location. Moreover, such notification will not require the low-range transceiver to be manned as all needed operations are performed in an operator-independent manner.

Additionally, it should be appreciated that the low-range transceiver is also configured to broadcast to at least one wearable transceiver a non-emergency signal. For example, where the user has a child in the child care facility, a hotel guest may be notified of an inconsolable infant. Such non-emergency paging may also be employed to announce to a larger group of guests the start of a scheduled activity (e.g., begin of a show or nature walk) or availability of a restaurant table.

Most preferably, the wearable transceiver is configured to provide both a text message and a verbal audible message using an alphanumeric display and a polyphonic speaker in a format that can be worn on a person or tucked away in a pocket or purse. For example, most preferred formats include keychain pendants, or the wearable transceiver may have a form of a bracelet, a ring, a pendant, or a pager, wherein the transceiver is most preferably waterproof, shockproof, and/or dustproof. In further especially preferred aspects, the wearable transceiver further includes a positioning implement (e.g., cell phone triangulator, GPS decoder, etc.) that allows transmission of positional information for the person wearing the wearable transceiver. While not limiting to the inventive subject matter, it is typically preferred that the wearable transceiver includes a button or other activating mechanism that allows a user to transmit a signal back to the low-range transmitter or other receiving station. For example, the feedback signal may be used to acknowledge receipt of an emergency signal (e.g., to account for alerted users), to confirm or decline an offer made through the low-range transceiver, to page a hotel clerk, etc. Thus, it should be appreciated that the wearable transceiver can be used for sending both emergency related signals (e.g., acknowledgement of an alert, positional information, and/or panic button function as safety device that transmits an emergency signal to the hotel, optionally including positional information) and non-emergency related signals (e.g., personal paging, confirmation of request, etc.).

Therefore, a notification system is generally contemplated that includes one or more trigger devices each having an input module that is configured to receive a first signal from a wide area notification device and an output module that is configured to provide a second signal to a low-range transceiver. Particularly preferred low-range transceivers are configured to provide a third signal to at least two wearable transceivers in response to the second signal, to provide a fourth non-emergency signal to at least one of the wearable transceivers in response to an operator input, and to optionally receive a fifth signal. Especially preferred wearable transceivers are configured to provide a notification to a person in response to at least one of the third (emergency) and fourth (non-emergency) signals, wherein the wearable transceivers are preferably configured to send the fifth (emergency and/or non-emergency) signal.

Figure 1B:
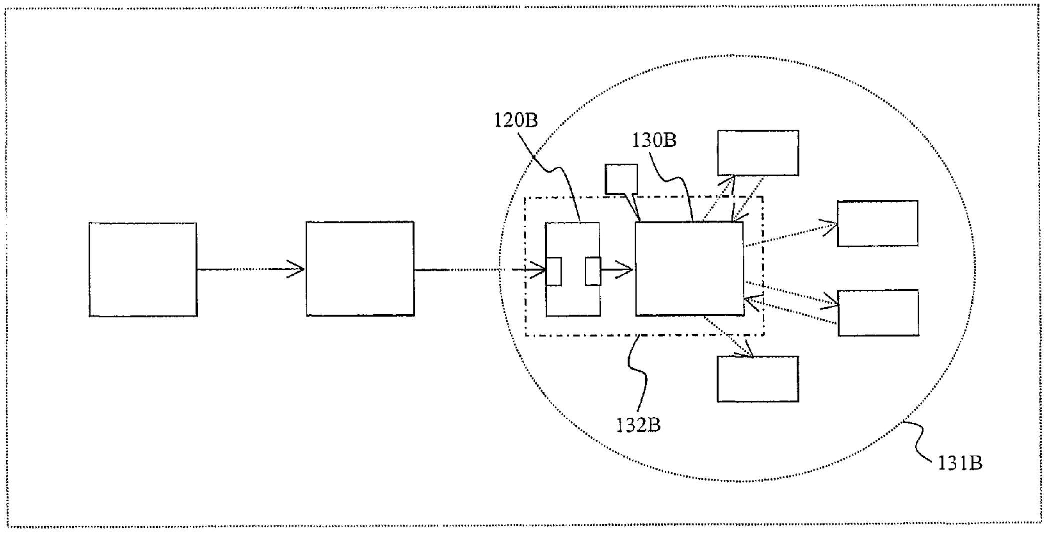
FIG. 1B is a schematic of an exemplary notification system in which the trigger device is physically associated with the low-range transceiver.

FIG. 1A depicts an exemplary notification system in which the notification system 100A has a wide area notification device 110A in enclosure 112A, wherein device 110A is activated in the wide area notification zone 114A by a wide area notification central or operator 102A using a wireless signal or signal transmitted via wire or fiber optic cable 104A. The wide area notification device 110A is further coupled to a trigger device 120A having input module 122A and output module 124A positioned. Here, input module 122A is directly coupled via electric connection 128A to the device activation controller (not shown) of device 110A, while the output module 124A is operationally coupled via radio link 126A to low-range transceiver 130. Transceiver 130 has a local notification area 131, which is entirely within wide area notification zone 114A. Wearable transceivers 140 are located within local notification area 131 and configured to receive via radio link 142 an emergency signal and via radio link 144 a non-emergency signal. Wearable transceivers 140 are further configured to provide a feedback signal 143A to the low-range transceiver 130A. Operator input 150A triggers non-emergency signal via 144A. Similarly, FIG. 1B depicts a system substantially identical to that of FIG. 1A with the exception that the trigger device 120B is now co-located with the low-range transceiver 130B in the transceiver housing 132B. Thus, the trigger device may be at least in part located within or outside the local notification area 131A/131B.

With respect to wide area notification devices other than sirens on a siren tower and public announcement stations, it is contemplated that all devices are deemed suitable for use herein that receive an emergency related signal from a central operator or alert station. For example, suitable wide area notification devices may be stationary (e.g., highway billboard, desktop computer or server, TV set, etc.) or mobile (e.g., laptop computer via hotspot or other wireless access, TAR in a hospital or hotel, cell phone or pager, etc).

Therefore, it should be appreciated that suitable trigger devices may be configured in various manners and that the particular configuration will at least to some degree depend on the specific wide area notification device. For example, where the wide area notification device is a TAR, it is generally preferred that the trigger device is integral with the wide area notification device. In a TAR, it is even more preferred that the trigger device routes and/or copies the audible alert directly to the wearable transmitters. In another example, where the wide area notification device is a public announcement device, the trigger device may be at least partially co-located with the wide area notification device. Consequently, the output module may configured such that the wide area notification device signal is transmitted to the low-range transceiver via a radio waves, fiber optic cable, and/or electric cable. In its most simple form, the trigger device is a simple wire connecting the wide area notification device with the low-range transmitter. In less preferred aspects, the trigger device may also be independent from both the wide area notification device and the low-range transceiver. For example, the trigger device may detect a strobe light or siren tone via a photocell or microphone, and may then transmit via radio waves a coded signal to the low-range transceiver. Therefore, and regardless of the implementation of the trigger device, it should be recognized that the trigger device provides an alert signal to the low-range transceiver in response to a wide area notification signal of the wide area notification device that is located in the wide area notification zone. Viewed from a different perspective, it should also be recognized that the low-range transceiver is operated within a wide area notification zone such that the low-range transceiver receives a signal from a trigger device.

With respect to suitable low-range transceivers, it is generally contemplated that all known low-range transceiver are suitable for use herein so long as such transceivers can (a) receive and/or translate a signal from the trigger device, (b) automatically transmit the signal from the trigger device or the translated signal to at least two wearable transceivers, and (c) transmit a non-emergency signal to at least one wearable transceiver. Most preferably, the low-range transceiver is configured to transmit at a frequency and output that does not require a broadcasting license. Therefore, typical range of a low-range transceiver will be less than 20 km, and even more typically less than 10 km (as measured between the low-range transceiver and the wearable transceiver. Depending on the particular transceiver and frequency band, it is contemplated that the low-range transceiver can simultaneously transmit an emergency signal to at least 10 users, more typically to at least 100 users, and most typically to at least 1000 users. However, alternative frequencies and output power are also deemed suitable. Suitable transmitted signals include text messages, voice messages, signals to activate strobe lights, vibrating implements, and/or hot/cold spots (e.g., Peltier element).

Furthermore, it should be recognized that contemplated low-range transceivers will also be configured to transmit a non-emergency signal to one or more predetermined wearable transceivers. Such transmission may be encoded or achieved by transmitting in a wearable transceiver specific channel similar or identical to restaurant pager systems. In additionally preferred aspects, the low-range transceiver is further configured to also receive one or more signals transmitted from the wearable transceivers. For example, where an emergency signal was sent to the wearable transceivers, a feedback signal from the wearable transceivers may be received by the low-range transceiver that acknowledges receipt of the emergency signal, optionally with an ID code, positional information, and/or time stamp of the wearable transceiver. Similarly, the low-range transceiver may also be configured to receive a feedback signal from the wearable transceivers in response to a non-emergency signal (e.g., signal that is specific to the location of the low-range transceiver, entertainment, and/or personal message).

Especially preferred wearable transceivers are configured to provide at least one of an emergency signal and a non-emergency signal in a text display format and/or verbal audible format to a user wearing such a transceiver. Moreover, such transceivers preferably are also configured to transmit a signal to a recipient (e.g., low-range transceiver or other receiver) that may include ID information, wearer information, positional information, time information, conformation of a message received, etc. There are numerous transceiver configurations known in the art and it should be recognized that a person of ordinary skill in the art will be readily able to modify a known transceiver to the wearable transceiver presented herein. For example, suitable wearable transceivers may be configured as a pendant, a ring, a bracelet, a wrist watch, or a pager, wherein the wearable transceivers are preferably waterproof, shockproof and/or dustproof.

Suitable alert notification may be performed in numerous manners on contemplated wearable transceivers. However, it is especially preferred that the notification is performed in at least one of a visual, audible, and tactile manner. For example, preferred visual manners include displayed messages on a small color screen, LCD display, alphanumeric display, or indicator lights lit next to a preformatted text message. Alternatively, or additionally, suitable audible manners include beepers, spoken messages using polyphonic speakers, and/or a sequence of particular signal or ring tones, Morse-code, etc. Tactile notification may be performed via vibrating or knocking elements, and/or via thermal hot/cold spots. Therefore, it should be especially appreciated that a user has a dual use of the system in which the wearable transceiver can be used as a lifesaving device as well as a communication device for personal and/or entertainment use. Thus, it is contemplated that a method of providing notification to a plurality of users includes a step of using a low-range transceiver to automatically, plurally, and locally relay within a wide area notification area an emergency signal from a wide area notification device and a step of manually providing a non-emergency signal to at least one of the plurality of users using the low-range transceiver, wherein the user has the option to send a feedback signal to the low-range transceiver (or other device) in response to the emergency and/or non-emergency signal. Transmission of the emergency and/or non-emergency signal is typically set off on multiple devices without regard to a waiting list or queue.

Thus, specific embodiments and applications of personal notification devices have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A notification apparatus for use in conjunction with a wide area notification device, comprising:

a trigger device electronically coupled to a low-range wireless transceiver, wherein the trigger device has an input module configured to receive a first signal from the wide area emergency notification device, and further has an output module configured to provide a second signal to the low-range wireless transceiver in response to the first signal;

wherein the low-range wireless transceiver is configured to (a) provide a third signal to at least two wearable wireless transceivers in response to the second signal, (b) provide a fourth signal to at least one of the wearable transceivers in response to a manual operator input by an operator of the low-range wireless transceiver, wherein the fourth signal is a user-specific and event-specific notification signal, and (c) optionally receive a fifth signal, and (d) provide a local audible and/or visible alert notification in response to the first signal;

wherein the first and the third signals are an emergency signal, and wherein the third and fourth signals are different and independent from each other;

wherein the wearable transceivers are configured to provide a notification to a person in response to at least one of the third and fourth signals, and wherein the wearable transceivers are optionally configured to send the fifth signal; and wherein the person is an individual other than the operator.

2. The notification apparatus of claim 1 wherein the wide area notification device is at least one of a siren tower, a tone alert radio, a telephone, a pager, a computer, and a TV set.

3. The notification apparatus of claim 1 wherein the trigger device is integral with the wide area notification device.

4. The notification apparatus of claim 1 wherein the output module is configured such that the second signal is transmitted to the low-range transceiver via a radio signal or an electric cable.

5. The notification apparatus of claim 1 wherein the low-range transceiver is configured to operate at a frequency and power output that allows operation without a broadcast license.

6. The notification apparatus of claim 1 wherein the third signal is an emergency signal, and wherein the fourth signal is a signal specific to the location of the low-range transceiver.

7. The notification apparatus of claim 1 wherein the wearable transceivers are configured to provide at least one of the third and fourth signal in at least one of a text display format, a verbal audible format, a strobe display, a hot/cold spot, and a vibrating function.

8. A method of providing a notification system, comprising the steps of instructing a user to:

operate a low-range transceiver within a wide area notification zone such that the low-range transceiver receives an emergency signal from a trigger device;

wherein the trigger device provides the emergency signal to the low-range transceiver in response to a wide area notification emergency signal of a wide area notification device located in the wide area notification zone; and distribute a plurality of wearable wireless transceivers to a plurality of users, wherein the low-range transceiver is configured to provide a local audible and/or visible alert notification in response to the emergency signal and to transmit a secondary emergency notification signal without user intervention to a plurality of wearable wireless transceivers, and further to transmit a tertiary signal with user intervention by an operator of the low-range transceiver to at least one of the plurality of wearable transceivers, wherein the tertiary signal is a user-specific and event-specific notification signal, wherein the plurality of users are persons other than the operator, and wherein the secondary signal and the tertiary signal are different and independent from each other.

9. The method of claim 8 wherein the trigger device is electronically coupled to the wide area notification device.

10. The method of claim 8 wherein the low-range transceiver is configured to operate at a frequency and power output that allows operation without a broadcast license.

11. The method of claim 8 wherein the low-range transceiver is configured to receive a feedback signal from at least one of the wearable transceivers.

12. The method of claim 8 wherein the wearable transceivers are configured as a pendant, a ring, a bracelet, a watch, a key ring, or a pager, and wherein the wearable transceivers are optionally at least one of waterproof, shockproof, and dustproof.

13. The method of claim 8 wherein at least one of the wearable transceivers is configured to provide a feedback signal to the low-range transceiver.

14. The method of claim 8 wherein the secondary notification signal is an emergency message and the tertiary notification signal is an entertainment or personal message.

15. A method of providing emergency and non-emergency event notification to a plurality of users, comprising:

using a low-range transceiver to automatically relay within a wide area notification area a first emergency notification signal from a wide area notification device, and to further provide an audible and/or visible alert notification in response to the first emergency notification signal; and manually, and independently from the first emergency notification signal, providing a second non-emergency notification signal to at least one of the plurality of users using the low-range transceiver, wherein the non-emergency notification signal is a user-specific and event-specific notification signal that is transmitted by an operator of the low-range transceiver to a wireless transmitter that is worn by a user, wherein the user is a person other than the operator.

16. The method of claim 15 wherein wide area notification device is at least one of a siren tower, a tone alert radio, a telephone, a pager, a computer, and a TV set.

17. The method of claim 15 wherein the wide area notification device and the low-range transceiver are operationally coupled via a trigger device.

18. The method of claim 15 wherein the notification signal has at least one of a text display format, a verbal audible format, a strobe display, a hot/cold spot, and a vibrating function.

19. The method of claim 15 wherein the wireless transmitter is a wearable transceiver.

20. The method of claim 19 further comprising a step of transmitting a feedback signal to the low-range transceiver using the wearable transceiver.

21. A wearable wireless transceiver configured to operate with the notification apparatus of claim 1.

22. A low-range transceiver configured to operate with the notification apparatus of claim 1.

23. A trigger device configured to operate with the notification apparatus of claim 1.

* * * * *